(12) United States Patent
Zavesky et al.

(10) Patent No.: US 11,282,278 B1
(45) Date of Patent: Mar. 22, 2022

(54) PROVIDING ADAPTIVE ASYNCHRONOUS INTERACTIONS IN EXTENDED REALITY ENVIRONMENTS

(71) Applicant: AT&T Intellectual Property I, L.P., Atlanta, GA (US)

(72) Inventors: Eric Zavesky, Austin, TX (US); Nigel Bradley, Canton, GA (US); James Pratt, Round Rock, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 17/221,732

(22) Filed: Apr. 2, 2021

(51) Int. Cl.
| | | |
|---|---|---|
| *G10L 15/22* | (2006.01) | |
| *G10L 25/63* | (2013.01) | |
| *G06T 19/00* | (2011.01) | |
| *G06N 3/00* | (2006.01) | |
| *G06F 3/01* | (2006.01) | |

(52) U.S. Cl.
CPC ............ *G06T 19/003* (2013.01); *G06F 3/013* (2013.01); *G06N 3/006* (2013.01); *G06T 19/006* (2013.01); *G10L 15/22* (2013.01); *G10L 25/63* (2013.01)

(58) Field of Classification Search
CPC ..... G06T 19/003; G06T 19/006; G10L 25/63; G10L 15/22; G06F 3/013; G06N 3/006
See application file for complete search history.

(56) References Cited

U.S. PATENT DOCUMENTS

| | | | |
|---|---|---|---|
| 2009/0044113 A1* | 2/2009 | Jones | G06T 13/40 715/707 |
| 2009/0240359 A1* | 9/2009 | Hyndman | H04L 65/4015 700/94 |
| 2010/0169800 A1* | 7/2010 | Lance | A63F 13/12 715/757 |
| 2011/0029889 A1* | 2/2011 | Karstens | A63F 13/335 715/745 |
| 2011/0055732 A1* | 3/2011 | Dawson | G06F 3/0482 715/757 |
| 2011/0131239 A1* | 6/2011 | Bates | G06F 16/636 707/769 |
| 2017/0189815 A1* | 7/2017 | Tweedale | A63F 13/212 |
| 2017/0326457 A1* | 11/2017 | Tilton | A63F 13/79 |
| 2019/0374857 A1* | 12/2019 | Deller | H04L 67/38 |
| 2020/0311995 A1* | 10/2020 | Lee | G06T 11/60 |

* cited by examiner

*Primary Examiner* — Jitesh Patel (57) ABSTRACT

In one example, a method performed by a processing system including at least one processor includes rendering an extended reality environment, receiving a request from a user endpoint device of a first user in the extended reality environment to place an avatar of the first user in the extended reality environment, placing the avatar of the first user within the extended reality environment, detecting that a second user is attempting to interact with the avatar of the first user, detecting conditions surrounding the avatar of the first user, identifying, based on the conditions, a set of candidate avatar personas for the first user, selecting a first avatar persona from among the set of candidate avatar personas, and rendering the avatar of the first user with the first avatar persona in the extended reality environment.

20 Claims, 3 Drawing Sheets

PROVIDING ADAPTIVE ASYNCHRONOUS INTERACTIONS IN EXTENDED REALITY ENVIRONMENTS

The present disclosure relates generally to extended reality (XR) systems, and relates more particularly to devices, non-transitory computer-readable media, and methods for generating and displaying avatars in XR environments that allow for adaptive asynchronous interactions among users.

BACKGROUND

Extended reality (XR) is an umbrella term that has been used to refer to various different forms of immersive technologies, including virtual reality (VR), augmented reality (AR), mixed reality (MR), cinematic reality (CR), and diminished reality (DR). Generally speaking, XR technologies allow virtual world (e.g., digital) objects to be brought into "real" (e.g., non-virtual) world environments and real world objects to be brought into virtual environments, e.g., via overlays or other mechanisms. XR technologies may have applications in fields including architecture, sports training, medicine, real estate, gaming, television and film, engineering, travel, and others. As such, immersive experiences that rely on XR technologies are growing in popularity.

SUMMARY

In one example, the present disclosure describes a device, computer-readable medium, and method for generating and displaying avatars in XR environments that allow for adaptive asynchronous interactions among users. For instance, in one example, a method performed by a processing system including at least one processor includes rendering an extended reality environment, receiving a request from a user endpoint device of a first user in the extended reality environment to place an avatar of the first user in the extended reality environment, placing the avatar of the first user within the extended reality environment, detecting that a second user is attempting to interact with the avatar of the first user, detecting conditions surrounding the avatar of the first user, identifying, based on the conditions, a set of candidate avatar personas for the first user, selecting a first avatar persona from among the set of candidate avatar personas, and rendering the avatar of the first user with the first avatar persona in the extended reality environment.

In another example, a non-transitory computer-readable medium stores instructions which, when executed by a processing system, including at least one processor, cause the processing system to perform operations. The operations include rendering an extended reality environment, receiving a request from a user endpoint device of a first user in the extended reality environment to place an avatar of the first user in the extended reality environment, placing the avatar of the first user within the extended reality environment, detecting that a second user is attempting to interact with the avatar of the first user, detecting conditions surrounding the avatar of the first user, identifying, based on the conditions, a set of candidate avatar personas for the first user, selecting a first avatar persona from among the set of candidate avatar personas, and rendering the avatar of the first user with the first avatar persona in the extended reality environment.

In another example, a device includes a processing system including at least one processor and a computer-readable medium storing instructions which, when executed by the processing system, cause the processing system to perform operations. The operations include rendering an extended reality environment, receiving a request from a user endpoint device of a first user in the extended reality environment to place an avatar of the first user in the extended reality environment, placing the avatar of the first user within the extended reality environment, detecting that a second user is attempting to interact with the avatar of the first user, detecting conditions surrounding the avatar of the first user, identifying, based on the conditions, a set of candidate avatar personas for the first user, selecting a first avatar persona from among the set of candidate avatar personas, and rendering the avatar of the first user with the first avatar persona in the extended reality environment.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure enhances social engagement among users in extended reality (XR) environments by generating and displaying avatars that allow users to interact in an adaptive asynchronous manner with other users. As discussed above, XR technologies allow virtual world (e.g., digital) objects to be brought into "real" (e.g., non-virtual) world environments and real world objects to be brought into virtual environments, e.g., via overlays or other mechanisms. One specific type of virtual world object is an avatar, or a digital representation of a person. The avatar may be used by the user to explore the XR environment, to interact with objects in the XR environment, and to interact with avatars of other users in the XR environment. Thus, the avatar functions as a virtual persona for the user within the XR environment.

As more and more interactions move to virtual environments including XR environments, there is a growing user demand for the ability to connect with other users via virtual personas that can be accessed at any time, e.g., including when the users who are represented by the virtual personas may not be "online" (e.g., actively logged into or engaged with the application that is rendering the virtual environment). Presently, options for asynchronous user interactions (i.e., interactions in which the two or more interacting users are online at different, potentially non-overlapping times) are limited. For instance, these options include static messages (e.g., email, voice messages, and the like) and more dynamic content (e.g., videos that may reenact an interaction) which have no anchors to particular locations within the XR environment.

Examples of the present disclosure allow users of XR environments to create a plurality of different avatar personas, where each avatar persona may provide an interaction that is representative of a different behavior of the user. The XR system (e.g., an application server rendering the XR environment) may then select one of a user's many avatar personas for presentation based on different triggers within the XR environment, where the triggers may be location-based or context-based. For instance, if the user's avatar is participating in a casual meeting within the XR environment, then it may be appropriate for the user's avatar to high-five another user's avatar as a form of greeting. However, if the meeting is a more formal meeting with American users (e.g., a business meeting), then it may be more appropriate for the user's avatar to shake hands with other user's avatars as a form of greeting. Similarly, if the meeting is a more formal meeting with Japanese users, then it may be more appropriate for the user's avatar to bow to the other user's avatars as a form of greeting. Thus, locational and situational context may be considered when determining which avatar persona of a plurality of avatar personas created for a given user should be presented to other users when the given user is not actively engaged in the extended reality environment. These and other aspects of the present disclosure are described in greater detail below in connection with the examples of FIGS. 1-3.

Within the context of the present disclosure, an interaction that is "asynchronous" is understood to refer to an interaction that is independent of time. For instance, in an asynchronous interaction occurring in an XR environment, at least one of the parties (e.g., a first party) participating in the interaction may not be "online" (e.g., logged into or otherwise actively engaged with the XR environment) at the time that the interaction is taking place. However, the interaction may still be able to proceed as a natural exchange that appears to be taking place synchronously, in real time as to one or more other parties, e.g., a second party.

Moreover, within the context of the present disclosure, an "avatar" is understood to refer to a digital representation of a user, where the digital representation may have certain visual features (e.g., an appearance), audible features (e.g., a voice), and the like which may be selected by the user. For instance, the user may configure the avatar to look and/or sound like the user, or the user may configure the avatar to look and/or sound different from the user. In either case, the avatar may function as a representation of the user in the XR environment. An avatar "persona" is understood to refer to a behavior of the user's avatar, where the behavior may vary depending on location, company, and/or other context of the avatar. According to examples of the present disclosures, multiple different personas may be created for the same avatar. Thus, the avatar may act or behave differently in different situations (while the appearance of the avatar may or may not change depending upon the situation).

Figure 1:
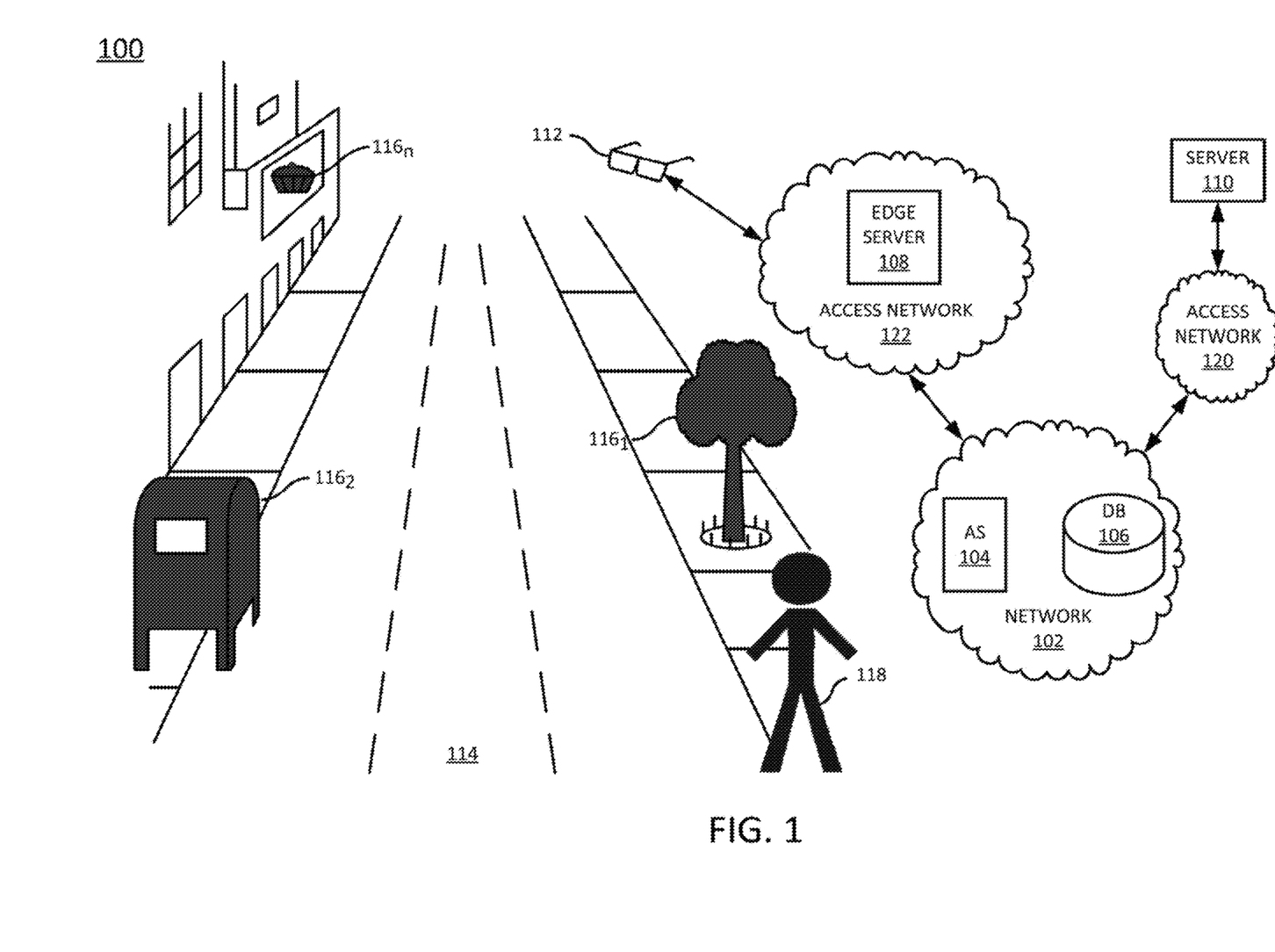
FIG. 1 illustrates an example system in which examples of the present disclosure may operate.

To further aid in understanding the present disclosure, FIG. 1 illustrates an example system 100 in which examples of the present disclosure may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, and the like), a long term evolution (LTE) network, 5G and the like related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a network 102, e.g., a telecommunication service provider network, a core network, or an enterprise network comprising infrastructure for computing and communications services of a business, an educational institution, a governmental service, or other enterprises. The network 102 may be in communication with one or more access networks 120 and 122, and the Internet (not shown). In one example, network 102 may combine core network components of a cellular network with components of a triple play service network; where triple-play services include telephone services, Internet or data services and television services to subscribers. For example, network 102 may functionally comprise a fixed mobile convergence (FMC) network, e.g., an IP Multimedia Subsystem (IMS) network. In addition, network 102 may functionally comprise a telephony network, e.g., an Internet Protocol/Multi-Protocol Label Switching (IP/MPLS) backbone network utilizing Session Initiation Protocol (SIP) for circuit-switched and Voice over internet Protocol (VoIP) telephony services. Network 102 may further comprise a broadcast television network, e.g., a traditional cable provider network or an internet Protocol Television (IPTV) network, as well as an Internet Service Provider (ISP) network. In one example, network 102 may include a plurality of television (TV) servers (e.g., a broadcast server, a cable head-end), a plurality of content servers, an advertising server (AS), an interactive TV/video on demand (VoD) server, and so forth.

In one example, the access networks 120 and 122 may comprise broadband optical and/or cable access networks, Local Area Networks (LANs), wireless access networks (e.g., an IEEE 802.11/Wi-Fi network and the like), cellular access networks, Digital Subscriber Line (DSL) networks, public switched telephone network (PSTN) access networks, $3^{rd}$ party networks, and the like. For example, the operator of network 102 may provide a cable television service, an IPTV service, or any other types of telecommunication service to subscribers via access networks 120 and 122. In one example, the access networks 120 and 122 may comprise different types of access networks, may comprise the same type of access network, or some access networks may be the same type of access network and other may be different types of access networks. In one example, the network 102 may be operated by a telecommunication network service provider. The network 102 and the access networks 120 and 122 may be operated by different service providers, the same service provider or a combination thereof, or may be operated by entities having core businesses that are not related to telecommunications services, e.g., corporate, governmental or educational institution LANs, and the like.

Figure 3:
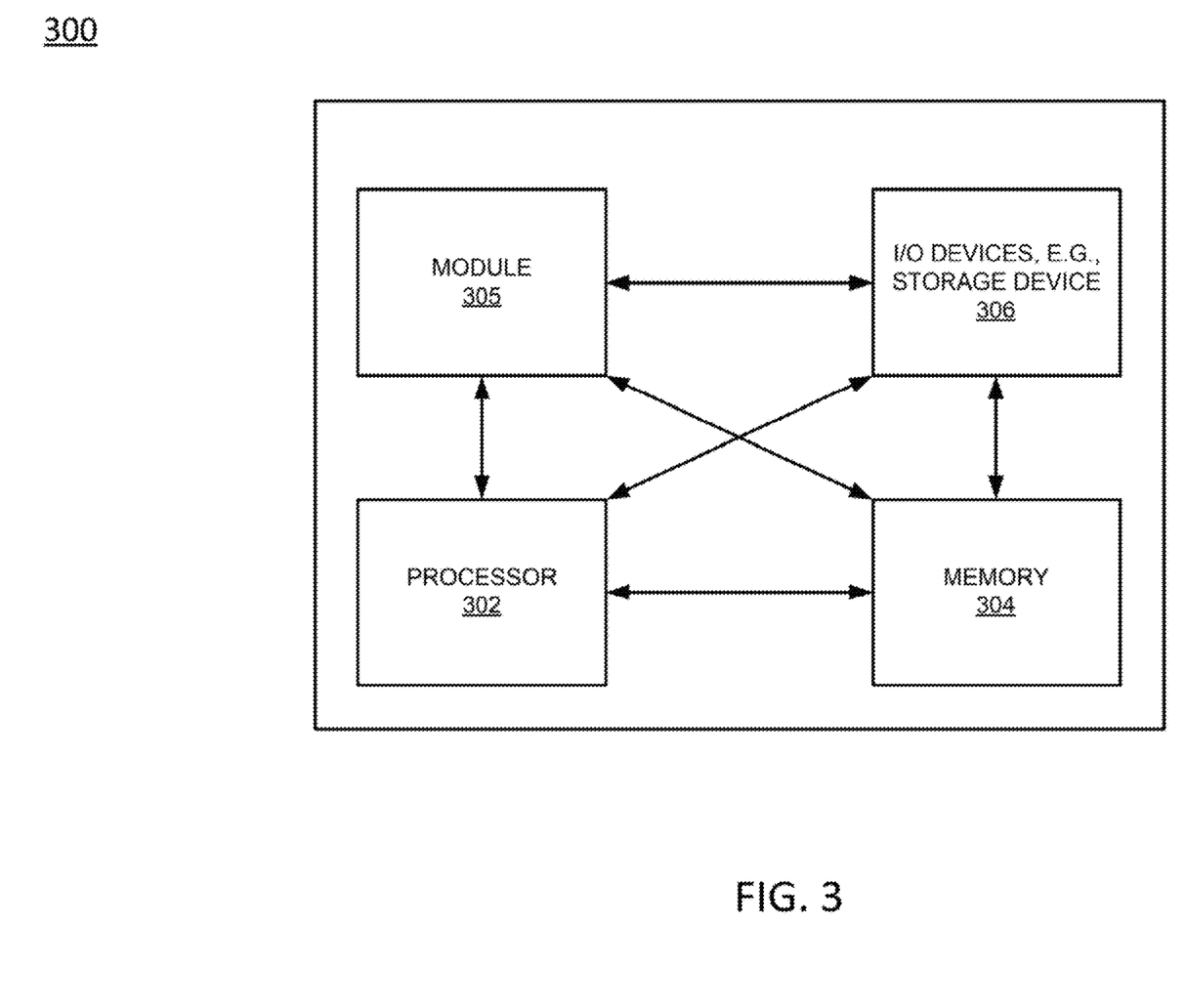
FIG. 3 depicts a high-level block diagram of a computing device specifically programmed to perform the functions described herein.

In accordance with the present disclosure, network 102 may include an application server (AS) 104, which may comprise a computing system or server, such as computing system 300 depicted in FIG. 3, and may be configured to provide one or more operations or functions in connection with examples of the present disclosure for anchor caching for extended reality applications. The network 102 may also include a database (DB) 106 that is communicatively coupled to the AS 104.

It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure. Thus, although only a single application server (AS) 104 and single database (DB) are illustrated, it should be noted that any number of servers may be deployed, and which may operate in a distributed and/or coordinated manner as a processing system to perform operations in connection with the present disclosure.

In one example, AS 104 may comprise a centralized network-based server for generating extended reality media. For instance, the AS 104 may host an application that allows users to create multiple different avatar personas of themselves, where the multiple different avatar personas may be used to interact with other users within an XR environment when the users represented by the avatars are offline (e.g., not logged into or otherwise actively engaged in the XR environment). The multiple different avatar personas may be programmed to represent instances of different behaviors of the associated user. For instance, in one example, when a first user is offline and a second user wishes to interact with the first user within the XR environment, the AS 104 may select an avatar persona from among the first user's multiple avatar personas to conduct an asynchronous interaction with the second user. The AS 104 may select the avatar persona from among the multiple avatar personas based on the conditions and context of the desired interaction, such as the relationship of the second user to the first user (e.g., family, friends, professional acquaintances, etc.), the conditions of the location within the XR environment where the interaction will take place (e.g., crowded, noisy, etc.), and the like.

In one example, AS 104 may comprise a physical storage device (e.g., a database server), to store sets of different avatar personas for the users of the XR environment, as discussed in greater detail below. For instance, the AS 104 may store an index, where the index maps each user in the XR environment to a plurality of different avatar personas for that user. In one example, the index may further map each avatar persona to a set of predefined actions and/or utterances, where each action or utterance in the set of predefined actions and/or utterances may be triggered by different locations, contexts, and/or events.

In a further example, the AS 104 may also store user profiles which may specify user preferences that can be used to filter a set of avatar personas for an asynchronous interaction. For instance, in one example, a user profile may specify, for each user: demographic information (e.g., age, gender, marital status, education, etc.), device information (e.g., whether the user uses a head mounted display, a mobile phone, a tablet computer, or the like to render and display XR media, the types of connections used by the device to access XR media such as cellular or WiFi, etc.), interests (e.g., favorite hobbies, sports teams, music, movies, etc.), usage history with respect to XR media (e.g., types of digital objects that the user has interacted with and/or ignored in the past), and/or preferences (e.g., does not like swearing or violence).

A user profile may also specify restrictions on the types of interactions that may be rendered for the user. For instance, a parent may configure a child's profile so that interactions which may be considered too violent or too scary (or which may include too much strong language) are prohibited from being rendered. In one example, profiles may be stored on an opt-in basis, i.e., a user may elect to not have a profile. In a further example, the user profiles may be stored in encrypted form to protect any user information that may be deemed private.

In one example, the DB 106 may store the avatar personas, the index, and/or the user profiles, and the AS 104 may retrieve the avatar personas, the index, and/or user profiles from the DB 106 when needed. For ease of illustration, various additional elements of network 102 are omitted from FIG. 1.

Figure 2:
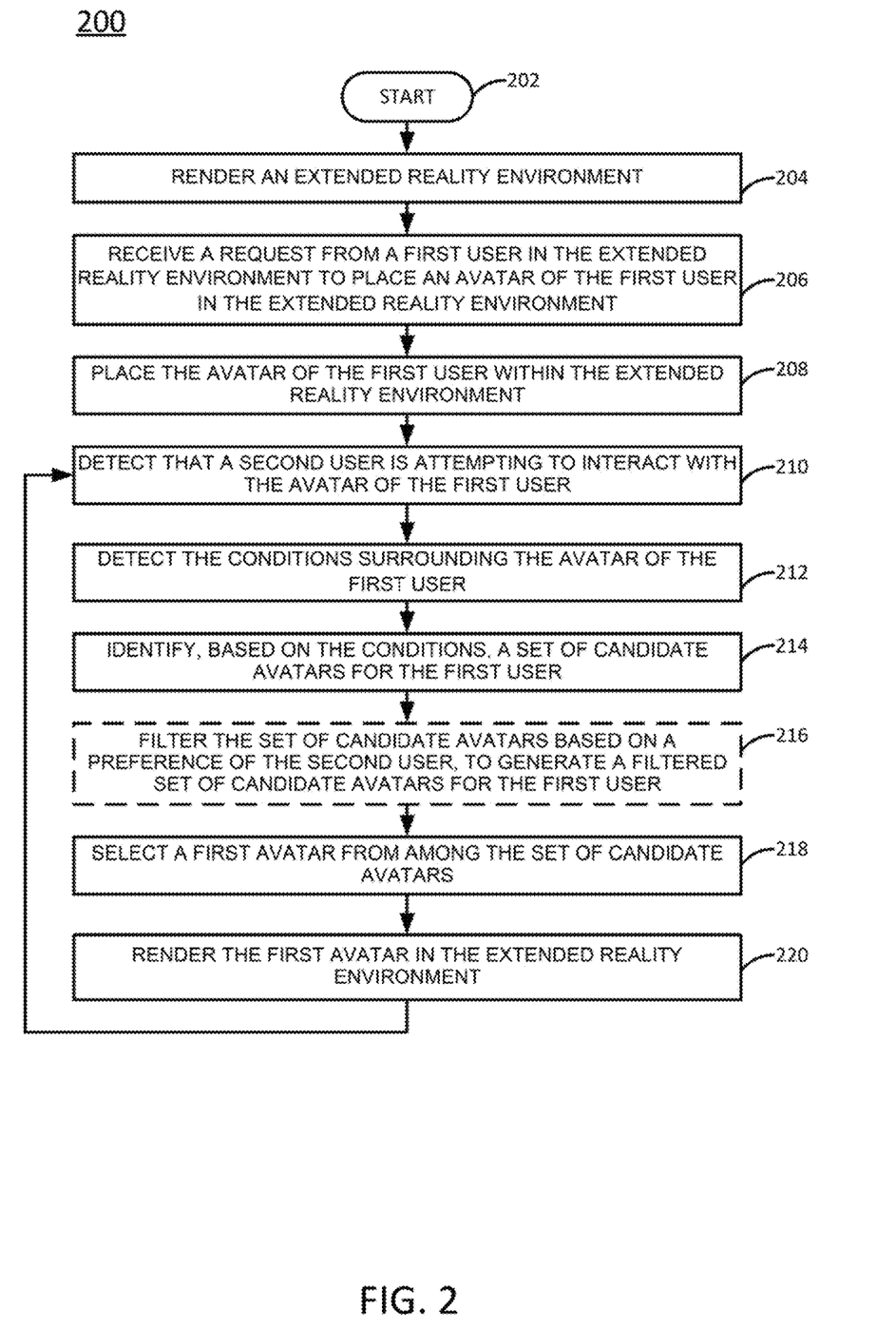
FIG. 2 illustrates a flowchart of an example method for providing adaptive asynchronous interactions in extended reality environments in accordance with the present disclosure.

In one example, access network 122 may include an edge server 108, which may comprise a computing system or server, such as computing system 300 depicted in FIG. 3, and may be configured to provide one or more operations or functions for providing adaptive asynchronous interactions in XR environments, as described herein. For instance, an example method 200 for providing adaptive asynchronous interactions in XR environments is illustrated in FIG. 2 and described in greater detail below.

In one example, application server 104 may comprise a network function virtualization infrastructure (NFVI), e.g., one or more devices or servers that are available as host devices to host virtual machines (VMs), containers, or the like comprising virtual network functions (VNFs). In other words, at least a portion of the network 102 may incorporate software-defined network (SDN) components.

Similarly, in one example, access networks 120 and 122 may comprise "edge clouds," which may include a plurality of nodes/host devices, e.g., computing resources comprising processors, e.g., central processing units (CPUs), graphics processing units (GPUs), programmable logic devices (PLDs), such as field programmable gate arrays (FPGAs), or the like, memory, storage, and so forth. In an example where the access network 122 comprises radio access networks, the nodes and other components of the access network 122 may be referred to as a mobile edge infrastructure. As just one example, edge server 108 may be instantiated on one or more servers hosting virtualization platforms for managing one or more virtual machines (VMs), containers, microservices, or the like. In other words, in one example, edge server 108 may comprise a VM, a container, or the like.

In one example, the access network 120 may be in communication with a server 110. Similarly, access network 122 may be in communication with one or more devices, e.g., a user endpoint device 112. Access networks 120 and 122 may transmit and receive communications between server 110, user endpoint device 112, application server (AS) 104, other components of network 102, devices reachable via the Internet in general, and so forth. In one example, user endpoint device 112 may comprise a mobile device, a cellular smart phone, a wearable computing device (e.g., smart glasses, a virtual reality (VR) headset or other types of head mounted display, or the like), a laptop computer, a tablet computer, or the like (broadly an "XR device"). In one example, user endpoint device 112 may comprise a computing system or device, such as computing system 300 depicted in FIG. 3, and may be configured to provide one or more operations or functions in connection with examples of the present disclosure for providing adaptive asynchronous interactions in XR environments.

In one example, server 110 may comprise a network-based server for generating XR media. In this regard, server 110 may comprise the same or similar components as those of AS 104 and may provide the same or similar functions. Thus, any examples described herein with respect to AS 104 may similarly apply to server 110, and vice versa. In particular, server 110 may be a component of an XR system operated by an entity that is not a telecommunications network operator. For instance, a provider of an XR system may operate server 110 and may also operate edge server 108 in accordance with an arrangement with a telecommunication service provider offering edge computing resources to third-parties. However, in another example, a telecommunication network service provider may operate network 102 and access network 122, and may also provide an XR system via AS 104 and edge server 108. For instance, in such an example, the XR system may comprise an additional service that may be offered to subscribers, e.g., in addition to network access services, telephony services, traditional television services, and so forth.

In an illustrative example, an XR system may be provided via AS 104 and edge server 108. In one example, a user may engage an application on user endpoint device 112 (e.g., an "XR device") to establish one or more sessions with the XR system, e.g., a connection to edge server 108 (or a connection to edge server 108 and a connection to AS 104). In one example, the access network 122 may comprise a cellular network (e.g., a 4G network and/or an LTE network, or a portion thereof, such as an evolved Uniform Terrestrial Radio Access Network (eUTRAN), an evolved packet core (EPC) network, etc., a 5G network, etc.). Thus, the communications between user endpoint device 112 and edge server 108 may involve cellular communication via one or more base stations (e.g., eNodeBs, gNBs, or the like). However, in another example, the communications may alternatively or additional be via a non-cellular wireless communication modality, such as IEEE 802.11/Wi-Fi, or the like. For instance, access network 122 may comprise a wireless local area network (WLAN) containing at least one wireless access point (AP), e.g., a wireless router. Alternatively, or in addition, user endpoint device 112 may communicate with access network 122, network 102, the Internet in general, etc., via a WLAN that interfaces with access network 122.

In the example of FIG. 1, user endpoint device 112 may establish a session with edge server 108 for obtaining an XR media. For illustrative purposes, the XR media may insert one or more digital objects into a real-time image stream of a real world scene to generate an XR environment. In this regard, an example XR environment 114 is illustrated in FIG. 1.

In one example, the XR environment 114 may be viewed by a user through the user endpoint device 112, e.g., on a display of a head mounted display or mobile phone, or through a set of smart glasses. As the user moves through the XR environment 114, the user endpoint device 112 (or alternatively the AS 104, edge server 108, or server 110) may detect one or more virtual items and/or avatars with which the user may interact. For instance, in the example of FIG. 1, the user may interact with virtual items $116_1$-$116_n$ (hereinafter individually referred to as a "virtual item 116" or collectively referred to as "virtual items 116") and/or avatar 118. Each virtual item 166 and avatar 118 may have a set of predefined actions that the user may take with respect to the virtual item 116 or avatar 118. Furthermore, in the case of the avatar 118, the avatar 118 may also have a set of predefined actions or utterances that the avatar 118 may perform or speak when triggered by the user. With no loss of generality, another example may represent a virtual item 116 as a digital twin (or XR representation) of a real world object, such as a real tree $116_1$ being mapped to a virtual tree at location $116_1$ where the XR experience can activate or disable itself according to the avatars or to the index of avatars in the presence of the virtual item.

As an example, where the virtual item is a tree (e.g., virtual item $116_1$), the user may be able to climb the tree, pick a piece of fruit from the tree, or the like. Where the virtual item is a mailbox (e.g., virtual item $116_2$), the user may be able to place a piece of mail in the mailbox.

In the case of the avatar 118, the avatar 118 may represent a specific user who may currently be offline (e.g., not currently logged into or actively engaged with the XR environment). However, the avatar 118 may be programmed with a predefined set of actions and/or utterances (a persona) that allows the user to interact with the specific user represented by the avatar in an asynchronous manner. For instance, the avatar 118 may be triggered to say something to the user and/or to perform some action upon the user attempting an interaction with the avatar 118. For instance, if the user waves to the avatar 118 or says hello, the avatar 118 may wave back or say hello to the user. The avatar 118 may be further customized to resemble the specific user represented by the avatar and to speak and behave like the specific user. Thus, if the avatar represents a friend of the user, when the user attempts to interact with the avatar 118, the avatar 118 may greet the user by name or hug the user (or the user's avatar). This more personalized interaction may provide for a more immersive experience.

It should also be noted that the system 100 has been simplified. Thus, it should be noted that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of network 102, access networks 120 and 122, and/or Internet may comprise a content distribution network (CDN) having ingest servers, edge servers, and the like for packet-based streaming of video, audio, or other content. Similarly, although only two access networks, 120 and 122 are shown, in other examples, access networks 120 and/or 122 may each comprise a plurality of different access networks that may interface with network 102 independently or in a chained manner. In addition, as described above, the functions of AS 104 may be similarly provided by server 110, or may be provided by AS 104 in conjunction with server 110. For instance, AS 104 and server 110 may be configured in a load balancing arrangement, or may be configured to provide for backups or redundancies with respect to each other, and so forth. Thus, these and other modifications are all contemplated within the scope of the present disclosure.

To further aid in understanding the present disclosure, FIG. 2 illustrates a flowchart of a method 200 for providing adaptive asynchronous interactions in extended reality environments in accordance with the present disclosure. In particular, the method 200 provides a method by which a user in an extended reality environment may place an avatar in the extended reality environment in order to interact asynchronously with other users. In one example, the method 200 may be performed by an XR server that is configured to generate digital overlays that may be superimposed over images of a "real world" environment to produce an extended reality environment, such as the AS 104 or server 110 illustrated in FIG. 1. However, in other examples, the method 200 may be performed by another device, such as the processor 302 of the system 300 illustrated in FIG. 3. For the sake of example, the method 200 is described as being performed by a processing system.

The method 200 beings in step 202. In step 204, the processing system may render an extended reality (XR) environment. As discussed above, the XR environment may be an environment that combines images or elements of the real world with digital or "virtual" elements. At least some of the virtual elements may be interactive, such that a user may interact with the virtual elements to trigger some action or event. A user may view and interact with the XR environment using any type of device of combination of devices that is capable of displaying and exchanging signals with the XR environment, including a mobile device such as a mobile phone or tablet computer or a wearable device such as a head mounted display.

In one example, the processing system may render the XR environment by generating a digital overlay that is superimposed over a stream of images (e.g., video) of a real world environment. For instance, a wearable device such as a head mounted display may present the overlay on a display while the user is viewing the real world environment through the head mounted display. In another example, the processing system may generate an entirely digital environment in which certain elements of a real world environment (e.g., buildings, vehicles, geological features, landmarks, etc.) are recreated in digital form.

In step 206, the processing system may receive a request from a user endpoint device of a first user in the extended reality environment to place an avatar of the first user in the extended reality environment. As discussed above, the avatar may comprise a digital representation of the first user. However, the avatar may not be simply a static representation of the first user; the avatar may be an interactive digital persona that mimics or emulates the personality and behaviors of the first user. When the first user is logged into or actively present and interacting within the XR environment, the first user may control the avatar. Thus, when the first user interacts with other users within the XR environment, the first user may actively control the utterances and behaviors of the avatar in real time (i.e., as the avatar is interacting with the other users).

However, the first user may wish to leave the avatar in the XR environment to interact with other users, even when the first user is not logged into or actively present and interacting within the XR environment. Thus, in this case, the first user may select a location within the XR environment and request that the processing system place the avatar in that location so that other users may interact with the avatar. In this case, the first user may not be capable of actively controlling the utterances and behaviors of the avatar in real time (i.e., as the avatar is interacting with the other users).

In step 208, the processing system may place the avatar of the first user within the extended reality environment. As discussed above, in one example, the processing system may place the avatar of the first user in a location within the XR environment that is chosen by the first user. In some examples, however, the first user may not specify a location for the avatar placement, or the requested location may be unavailable (e.g., placement of the avatar in the requested location may obstruct other users' access to other interactive virtual elements within the XR environment, or placement of the avatar in the requested location may render the avatar difficult for other users to see). Thus, in such cases, the processing system may automatically select a location for the placement of the avatar. In one example, the processing system may place the avatar as close as possible to a location requested by the first user (e.g., while minimizing any obstruction of other virtual elements by the avatar).

As discussed above, in one example, a plurality of avatar personas may be associated with the first user, where each avatar persona of the plurality of avatar personas may present an interaction that is representative of a different behavior of the first user. For instance, a first avatar persona may present a casual social interaction that is suitable for greeting close friends (e.g., high-fiving, using slang language, etc.), while a second avatar persona may present a more formal social interaction that is more suitable for greeting professional acquaintances or individuals with whom the first user is less socially familiar (e.g., shaking hands, using more formal language, etc.). In one example, the request from the first user may identify which avatar persona of the plurality of avatar personas the first user wishes to have placed in the XR environment (e.g., as a default avatar persona). However, as discussed in further detail below, the avatar persona that is presented to other users to represent the first user may be adapted or changed over time based on changing circumstances and conditions within the XR environment.

In another example, the processing system may select which avatar persona of the plurality of avatar personas to place for the first user (e.g., as a default avatar persona), based on the current conditions within the XR environment at the placement location. In one example, the conditions may include one or more of: the physical location of the placement location (e.g., coordinates within a coordinate system), the orientation of the placement location, the environmental conditions (e.g., sunny, rainy, noisy, etc.) present at the placement location, time of day within the XR environment (e.g., morning hours. afternoon hours, evening hours, night hours, a particular hour or time (e.g., 1:00 pm), etc.) and/or the social conditions (e.g., behaviors or demeanors of other users) present at the placement location. At least some of these conditions may be detected through the use of sensors (e.g., cameras, microphones, and/or the like) which may be used to gather data from the placement location and provide the data to the processing system (or another system) for further analysis.

In step 210, the processing system may detect that a second user is attempting to interact with the avatar of the first user, e.g., via a user endpoint device of the second user. At this time, the first user may not be logged into or actively present and interacting in the XR environment. Thus, the avatar of the first user may conduct an interaction with the second user in an asynchronous manner. That is, although the interaction may appear, from the second user's perspective, to be happening in real time (e.g., as if happening with a first user who is logged into or actively present within the XR environment), the utterances and/or behaviors of the first user's avatar may be predefined to at least some extent.

In one example, the processing system may detect the second user attempting to interact with the avatar of the first user when some signal is received from the second user. For instance, the second user, e.g., via the user endpoint device of the second user, may click on or position a pointer over the avatar of the first user, may speak an utterance that indicates that an interaction with the avatar of the first user is desired (e.g., "Hello, Eric" or "Excuse me, sir"), or may move in a direction toward the avatar of the first user while the avatar of the first user is within the direction of the second user's gaze (e.g., as may be monitored by a head mounted display or other external sensors).

In step 212, the processing system may detect the conditions surrounding the avatar of the first user. As discussed above, the conditions may include one or more of: the physical location of the placement location (e.g., coordinates within a coordinate system), the orientation of the placement location, the environmental conditions (e.g., sunny, rainy, noisy, etc.) present at the placement location, the time of day, and/or the social conditions (e.g., behaviors or demeanors of other users) present at the placement location. At least some of these conditions may be detected through the use of sensors (e.g., cameras, microphones, and/or the like).

In step 214, the processing system may identify, based on the conditions determined in step 212, a set of candidate avatar personas for the avatar of the first user (e.g., to replace the default avatar persona placed in step 208). For instance, the conditions may serve as a filter for determining which avatar personas of the plurality of avatar personas may be suitable or unsuitable for interacting with the second user at the current time. One or more machine learning and/or learning from demonstration techniques may be used to determine which types of avatar personas (or more specifically, which types of action, utterances, and/or behaviors) may be suitable or unsuitable given a specific set of conditions. Other examples may include the social company as a combination of the first user and the second user in the XR experience. For example, in one scenario, the second user may be accompanied by her children, while the first user's avatar may be accompanied by no other avatars. In this case, it may be appropriate to present an informal, familiar avatar persona as the first user's avatar persona. In another scenario, the second user may be alone, but the first user's avatar may be accompanied by other avatars or users which may trigger a more formal social environment. In another scenario, conditions may change as part of the XR experience itself, where both the first user's avatar and the second user are participating in the "introduction" stage of a racing XR experience. However, after a period of conversational time, the XR experience may transition to the "competition" stage, such that the avatar of the first user changes appearance or social mannerisms or detects similar changes from the second user.

As an example, if the conditions are noisy, it may not be appropriate to include an avatar persona in the set of candidate avatar personas which whispers or speaks in a very quiet voice. Similarly, if the second user appears to be upset (e.g., if audio of the second user appears to show the second user crying, or if the avatar of the second user is frowning), then it may not be appropriate to include an avatar persona in the set of candidate avatar personas that is loud and boisterous. As another example, if the second user is determined to be a professional acquaintance of the first user (e.g., based on recognition of the second user's user ID, comparison to a set of contacts for the first user, or the like), then the set of candidate avatar personas may only include avatar personas that are dressed in business attire (e.g., suits or business casual attire, as opposed to jeans and t-shirts) and/or that speak and behave in a more formal demeanor.

In optional step 216 (illustrated in phantom), the processing system may filter the set of candidate avatar personas based on a preference of the second user, to generate a filtered set of candidate avatar personas for the first user. For instance, a profile for the second user may include the second user's preferences for interacting with other users in the XR environment. As an example, the second user may be a child whose parents have configured parental control settings to control the child's interactions within the XR environment. Thus, the second user's preferences may indicate that the second user does not wish to engage in interactions that include swearing or violence. As a result, any avatar personas in the set of candidate avatar personas which may speak or behave in a manner that is violent or that includes swearing may be filtered (i.e., removed) from the set of candidate avatar personas. As another example, the second user's preferences may indicate that the second user is an avid hockey fan. In this case, an avatar persona in the set of candidate avatar personas that knows hockey statistics and/or is wearing the jersey of a professional hockey team (or is changed dynamically in the XR environment, e.g., showing the avatar taking the action of flipping over a shirt revealing a hockey team logo or taking an action of putting on an outer jacket with the hockey team logo and so on) may be appropriate to keep for consideration in the set of candidate avatar personas, and may even be prioritized or ranked highly relative to other avatar personas in the set of candidate avatar personas.

In step 218, the processing system may select a first avatar persona from among the (optionally filtered) set of candidate avatar personas. In one example, the first avatar persona may be the avatar persona in the set of candidate avatar personas that the processing system determines is most appropriate for the conditions surrounding the avatar of the first user. For instance, the processing system may rank the set of candidate avatar personas in an order from most appropriate to least appropriate for the conditions. The ranking may take into consideration any metadata associated with the plurality of avatar personas, where the processing system may attempt to match the metadata to metadata or keywords describing the set of conditions. For instance, as discussed above, if the conditions are noisy, then the processing system may rank an avatar persona whose metadata indicates that the avatar persona speaks in a whisper relatively low. Similarly, if the profile for the second user indicates that the second user likes hockey, then the processing system may rank an avatar persona whose metadata indicates that the avatar persona is wearing a hockey jersey or can discuss hockey relatively high. In one example, the processing system may select the avatar persona with the highest ranking. In another example, the processing system may detect a pattern of behaviors from the second user that will trigger selection of an avatar persona that is not related to the most relevant interaction. For instance, in a gaming scenario or a malicious hacking scenario, the second user may repeat an interaction with the first user's avatar to discover a weakness in the avatar indexing system or in an avatar index that is valid but is not intended for the second user's current conditions. In this situation, the system may default to a generic or incorrect avatar response to avoid or temporarily suppress anomalous interactions of the second user (much like current password entry systems may block a user after a number of consecutive wrong entries). Other behaviors may also be enabled by the system, but the selection stage (e.g., step 218) may contain historical conditions from the second user to assist in determining appropriate actions in this situation.

In step 220, the processing system may render the avatar of the first user with the first avatar persona in the extended reality environment. That is, the processing system may insert the avatar of the first user into the XR environment so that the second user may interact with the avatar of the first user in a manner that is consistent with the first avatar persona. The avatar of the first user may be rendered in such a manner that the avatar of the first user may replay a set of predefined actions (e.g., high fiving, hand shaking, dancing, etc.) and/or predefined utterances. In one example, the predefined actions and/or utterances may not necessarily be played in any sort of defined or continuous order. For instance, the avatar of the first user may have a set of predefined actions that the avatar of the first user can perform and a set of predefined utterances that the avatar of the first user can speak. Any one of these predefined actions or predefined utterances may be selected by the processing system for rendering in response to some sort of trigger. The trigger may be an action or utterance of the second user. For instance, if the second user holds out a hand for a high five, then the processing system may control the avatar of the first user to return the high five. If the second user makes a statement about a particular hockey team, then the processing system may control the avatar of the first user to respond with another statement about the particular hockey team or about hockey in general.

The method 200 may thus return to step 210 and may continue to adapt the avatar of the first user (e.g., adapt the persona of the avatar of the first user) in response to the actions and/or utterances of the second user. This interaction may continue until the second user gives some indication that the interaction is over (e.g., the second user may walk away, or say "goodbye," or "I have to go now."). Steps of the method 200 may also be repeated for subsequent users who may wish to interact with the avatar of the first user, and different avatar personas for the avatar of the first user may be selected for these subsequent users based on the conditions at the time of the interactions and/or the preferences of the subsequent users, as discussed above.

Thus, examples of the disclosure allow a first user to interact with a second user in an XR environment in an asynchronous manner. That is, the first user may be able to "interact" with the second user even when the first user is not online or actively engaged in the XR environment. This is made possible by the use of multiple different avatar personas for the avatar of the first user, where each avatar persona of the multiple different avatar personas may be programmed to perform a set of predefined actions and/or speak a set of predefined utterances that provide an interaction that is representative of a different behavior of the first user. Thus, when the second user attempts to interact with the first user (who may be offline or not actively engaged in the XR environment), a processing system may select an appropriate avatar persona for the first user, from among the multiple different avatar personas, to present to the second user. This provides for a more natural and more immersive experience for users, even when some users may be offline. It should be noted that the second user may also be offline or not actively engaged in the XR environment in this case. For instance, two avatars having respective sets of predefined actions and/or utterances may interact with each other in an asynchronous manner. Furthermore, lower ranked avatar personas of the avatar of the first user may be subsequently deployed if the second user returns to again interact with the avatar of the first user in some later time. Selecting a different avatar persona of the avatar of the first user may be more engaging for the second user to provide variability in the interactions.

The ability to provide adaptive asynchronous interactions in XR environments may have a number of applications in the XR field. For instance, in one example, a user may take an avatar "selfie" and leave the avatar at a particular location in an XR environment. In a heavily socialized environment (e.g., where memes and sharing may be encouraged), these types of avatars may have predefined patterns of actions that can be replayed or dismissed for the purposes of entertainment or adaptation. The predefined patterns of actions may embody the personality of the user who the avatar represents, thereby allowing the user to personalize the avatar. A first user might also identify an avatar of a second user, where the avatar of the second user is performing some sort of action, and may "borrow" or request that the action be applied to the first user's avatar.

In another example, a user may create an avatar to connect with a particular action or location. In this case, the user may use local objects in a location to capture actions for later replay. For instance, the user may create an avatar of himself performing a trick on a skateboard, and leave the avatar at a skate park in the XR environment. In another example, a user's avatar may be created with superhero powers, and the user may point to different locations or objects in the XR environment to define jump points for the avatar.

In another example, a repeatable game scenario may be created for educational or entertainment purposes. For instance, different avatars could be created to act as different game characters, to perform different game actions (e.g., running back and forth, guarding an object), to provide motivational support or hints, and the like. In one particular example, a virtual scavenger hunt could be created within the XR environment. In this case, certain asynchronous interactions with avatars may only be unlocked when a user has completed some other list of actions or interactions first.

In another example, an avatar may be created to function as a virtual tour guide or concierge. In this case, different actions, utterances, and/or behaviors for the avatar may be triggered at different locations. For instance, a virtual tour guide in an art museum may be programmed with a first set of utterances (e.g., facts, trivia, answers to frequently asked questions, etc.) that is triggered when the virtual tour guide is within x feet of a first painting and a second set of utterances that is triggered when the virtual tour guide is within x feet of a second painting. Thus, a user or business may be able to create a semi-knowledgeable presence with some limited interaction patterns that can be placed at specific locations to assist, direct, or educate other users at those locations.

As also discussed above, learning from demonstration techniques may also be used to help determine suitable or unsuitable behaviors, utterances, and actions for given conditions and contexts. In a further example, these techniques may also be used to learn how a particular user reacts to specific conditions and contexts, which may help to further personalize different avatars for the particular user. In a further example, such techniques could be used to personalize a base or template avatar for the particular user. For instance, a template avatar for "ninja" could be personalized to incorporate physical features, mannerisms, and/or speech patterns of the particular user.

In some examples, a user who has placed an avatar for asynchronous interactions in an XR environment may receive notifications when other users interact with the avatar. For instance, the user may receive a summary or replay of the interactions. These notifications may help the user to make decisions which may affect the avatar, such as adapting certain patterns of behavior to new users or contexts. For instance, when interacting asynchronously with specific other users, the user may want the avatar to hug those other users after offering a high five.

Avatars may also be constructed from historical synchronous interactions involving a user. Such avatars may emulate the user in a way that allows family or friends to interact with the user when the user may no longer be present or may only be capable of interacting in person in limited ways (e.g., as in the case of a user who may have neurodegenerative disease or impairment due to an accident).

Although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the examples of the present disclosure.

FIG. 3 depicts a high-level block diagram of a computing device specifically programmed to perform the functions described herein. For example, any one or more components or devices illustrated in FIG. 1 or described in connection with the method 200 may be implemented as the system 300. For instance, a server (such as might be used to perform the method 200) could be implemented as illustrated in FIG. 3.

As depicted in FIG. 3, the system 300 comprises a hardware processor element 302, a memory 304, a module 305 for providing adaptive asynchronous interactions in extended reality environments, and various input/output (I/O) devices 306.

The hardware processor 302 may comprise, for example, a microprocessor, a central processing unit (CPU), or the like. The memory 304 may comprise, for example, random access memory (RAM), read only memory (ROM), a disk drive, an optical drive, a magnetic drive, and/or a Universal Serial Bus (USB) drive. The module 305 for providing adaptive asynchronous interactions in extended reality environments may include circuitry and/or logic for performing special purpose functions relating to the operation of a home gateway or XR server. The input/output devices 306 may include, for example, a camera, a video camera, storage devices (including but not limited to, a tape drive, a floppy drive, a hard disk drive or a compact disk drive), a receiver, a transmitter, a speaker, a display, a speech synthesizer, an output port, and a user input device (such as a keyboard, a keypad, a mouse, and the like), or a sensor.

Although only one processor element is shown, it should be noted that the computer may employ a plurality of processor elements. Furthermore, although only one computer is shown in the Figure, if the method(s) as discussed above is implemented in a distributed or parallel manner for a particular illustrative example, i.e., the steps of the above method(s) or the entire method(s) are implemented across multiple or parallel computers, then the computer of this Figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 305 for providing adaptive asynchronous interactions in extended reality environments (e.g., a software program comprising computer-executable instructions) can be loaded into memory 304 and executed by hardware processor element 302 to implement the steps, functions or operations as discussed above in connection with the example method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for providing adaptive asynchronous interactions in extended reality environments (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described example examples, but should be defined only in accordance with the following claims and their equivalents.

What is claimed is:

1. A method comprising:
   rendering, by a processing system including at least one processor, an extended reality environment;
   receiving, by the processing system, a request from a user endpoint device of a first user in the extended reality environment to place an avatar of the first user in the extended reality environment;

placing, by the processing system, the avatar of the first user within the extended reality environment;

detecting, by the processing system, that a second user is attempting to interact with the avatar of the first user;

detecting, by the processing system, conditions surrounding the avatar of the first user;

identifying, by the processing system based on the conditions, a set of candidate avatar personas for the avatar of the first user;

selecting, by the processing system, a first avatar persona from among the set of candidate avatar personas; and rendering, by the processing system, the avatar of the first user with the first avatar persona in the extended reality environment.

2. The method of claim 1, wherein the set of candidate avatar personas comprises a subset of a plurality of avatar personas associated with the avatar of the first user, and wherein each avatar persona of the plurality of avatar personas associated with the avatar of the first user represents a different behavior of the avatar of the first user.

3. The method of claim 2, wherein the different behavior comprises a predefined action to be performed by the each avatar persona in response to an occurrence of a trigger.

4. The method of claim 2, wherein the different behavior comprises a predefined utterance to be spoken by the each avatar persona in response to an occurrence of a trigger.

5. The method of claim 2, wherein the conditions comprise at least one selected from a group of: a location of the avatar of the first user in the extended reality environment, an orientation of the location of the avatar of the first user in the extended reality environment, a time of day in the extended reality environment, and an environmental condition of the location of the avatar of the first user in the extended reality environment.

6. The method of claim 2, wherein the conditions comprise social conditions of a location of the avatar of the first user in the extended reality environment.

7. The method of claim 2, wherein the conditions comprise a demeanor of the second user.

8. The method of claim 2, wherein the conditions comprise a relationship of the second user to the first user.

9. The method of claim 1, wherein the rendering comprises controlling the avatar of the first user to carry out an interaction with the second user while the first user is offline.

10. The method of claim 1, wherein the detecting that the second user is attempting to interact with the avatar of the first user comprises detecting that a user endpoint device of the second user has clicked on or positioned a pointer over the avatar of the first user.

11. The method of claim 1, wherein the detecting that the second user is attempting to interact with the avatar of the first user comprises detecting that a user endpoint device of the second user has provided a spoken utterance that indicates that an interaction with the avatar of the first user is desired.

12. The method of claim 1, wherein the detecting that the second user is attempting to interact with the avatar of the first user comprises detecting a signal from a user endpoint device of the second user that the second user is moving in a direction toward the avatar of the first user while the avatar of the first user is within a direction of a gaze of the second user.

13. The method of claim 1, further comprising:

filtering, by the processing system, the set of candidate avatar personas based on a preference of the second user to generate a filtered set of candidate avatar personas for the first user, wherein the first avatar persona is selected from among the filtered set of candidate avatar personas.

14. The method of claim 13, wherein the filtering comprises removing, from the set of candidate avatar personas for the first user, any avatar personas representing behavior that the preference indicates the second user does not wish to see.

15. The method of claim 13, wherein the filtering comprises removing, from the set of candidate avatar personas for the first user, any avatar personas speaking utterances that the preference indicates the second user does not wish to hear.

16. The method of claim 1, wherein the rendering comprises controlling the avatar of the first user to function as a virtual tour guide within the extended reality environment.

17. The method of claim 16, wherein the rendering further comprises controlling the avatar of the first user to speak an utterance that is triggered by a specific location within the extended reality environment.

18. The method of claim 16, wherein the rendering further comprises controlling the avatar of the first user to perform an action that is triggered by a specific location within the extended reality environment.

19. A non-transitory computer-readable medium storing instructions which, when executed by a processing system including at least one processor, cause the processing system to perform operations, the operations comprising:

rendering an extended reality environment;

receiving a request from a user endpoint device of a first user in the extended reality environment to place an avatar of the first user in the extended reality environment;

placing the avatar of the first user within the extended reality environment;

detecting that a second user is attempting to interact with the avatar of the first user;

detecting conditions surrounding the avatar of the first user;

identifying, based on the conditions, a set of candidate avatar personas for the first user;

selecting a first avatar persona from among the set of candidate avatar personas; and rendering the avatar of the first user with the first avatar persona in the extended reality environment.

20. A device comprising:

a processing system including at least one processor; and a computer-readable medium storing instructions which, when executed by the processing system, cause the processing system to perform operations, the operations comprising:

rendering an extended reality environment;

receiving a request from a user endpoint device of a first user in the extended reality environment to place an avatar of the first user in the extended reality environment;

placing the avatar of the first user within the extended reality environment;

detecting that a second user is attempting to interact with the avatar of the first user;

detecting conditions surrounding the avatar of the first user;

identifying, based on the conditions, a set of candidate avatar personas for the first user;

selecting a first avatar persona from among the set of candidate avatar personas; and rendering the avatar of the first user with the first avatar persona in the extended reality environment.

\* \* \* \* \*